(12) United States Patent
Hoffmann

(10) Patent No.: US 9,170,044 B2
(45) Date of Patent: Oct. 27, 2015

(54) FROST INHIBITING JOINTS FOR INSULATED PANELS AND CURTAINS

(71) Applicant: David J. Hoffmann, Peosta, IA (US)

(72) Inventor: David J. Hoffmann, Peosta, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 122 days.

(21) Appl. No.: 13/715,485

(22) Filed: Dec. 14, 2012

(65) Prior Publication Data

US 2014/0166214 A1    Jun. 19, 2014

(51) Int. Cl.
*F25D 23/06* (2006.01)
*F25D 13/04* (2006.01)
*F25D 23/02* (2006.01)
*E05D 1/06* (2006.01)
*E05D 7/10* (2006.01)
(Continued)

(52) U.S. Cl.
CPC ............. *F25D 23/023* (2013.01); *E05D 1/06* (2013.01); *E05D 7/10* (2013.01); *E05D 15/0621* (2013.01); *F25D 23/02* (2013.01); *F25D 23/028* (2013.01); *F16B 2001/0028* (2013.01)

(58) Field of Classification Search
CPC ... B29C 66/1142; E04B 1/003; F25D 23/063; F25D 23/069; F25D 23/025; F25D 13/04; F25D 17/045; F25D 17/065
USPC .......... 52/238.1, 506.02, 741.4, 204.6, 204.5, 52/204.71, 459, 578, 440; 62/441, 447, 62/383
See application file for complete search history.

(56) References Cited

U.S. PATENT DOCUMENTS 3,572,002 A * 3/1971 Nichols .................. 52/745.07
3,587,199 A * 6/1971 Henry ..................... 52/582.2
(Continued)

FOREIGN PATENT DOCUMENTS

DE    19528243 A1    2/1996
FR    2285179 A1    4/1976
(Continued)

OTHER PUBLICATIONS

International Searching Authority, "Partial International Search Results", mailed on Jul. 4, 2014, 4 pages.
(Continued)

*Primary Examiner* — Elizabeth A Plummer
*Assistant Examiner* — Kyle Waldraed-Sullivan
(74) *Attorney, Agent, or Firm* — Hanley, Flight & Zimmerman, LLC

(57) ABSTRACT

Example panel assemblies with frost inhibiting seal members are disclosed herein. Some example panel assemblies disclosed herein are particularly suited for creating a blast freezer (for food and other products) by using the panels in cordoning off a relatively small quick-freeze area within a larger freezer room. In some examples disclosed herein, a touch-and-hold fastener (e.g., VELCRO) connects two or more insulated flexible panels along their adjoining vertical edges to span the width of a supporting frame that is wider than a width of a single panel. To seal the joint and/or inhibit frost from developing along the joint, some example panel assemblies disclosed herein include a seal member with touch-and-hold elements plus sealing edges extending laterally in opposite directions. In some examples disclosed herein, the touch-and-hold elements couple two panels together while the sealing edges (e.g., foam strip or double looped sheet of material) block air from flowing through the touch-and-hold elements.

26 Claims, 3 Drawing Sheets

(51) Int. Cl.
*E05D 15/06* (2006.01)
*F16B 1/00* (2006.01)

(56) References Cited

U.S. PATENT DOCUMENTS

| | | | | |
|---|---|---|---|---|
| 3,832,817 | A | * | 9/1974 | Martens ................ 52/583.1 |
| 4,057,948 | A | * | 11/1977 | Wise .................... 52/584.1 |
| 4,170,952 | A | * | 10/1979 | McCown ................ 114/74 A |
| 4,240,233 | A | * | 12/1980 | Vercelletto ............ 52/127.3 |
| 4,422,199 | A | | 12/1983 | Frommelt |
| 4,557,008 | A | | 12/1985 | Jurden |
| 4,682,382 | A | * | 7/1987 | Bennett ................ 14/71.3 |
| 4,691,478 | A | | 9/1987 | Lorg |
| 4,801,180 | A | | 1/1989 | Styles |
| 4,883,331 | A | | 11/1989 | Mengel |
| 4,957,600 | A | | 9/1990 | Carlson et al. |
| 5,143,137 | A | | 9/1992 | West |
| 5,216,860 | A | * | 6/1993 | Thomson et al. ......... 52/259 |
| 5,671,582 | A | * | 9/1997 | Reay .................... 52/745.05 |
| 6,771,183 | B2 | * | 8/2004 | Hunter ................ 340/870.01 |
| 6,793,436 | B1 | * | 9/2004 | Ruel et al. ............. 403/316 |
| 2006/0026912 | A1 | | 2/2006 | Eungard et al. |
| 2006/0032159 | A1 | | 2/2006 | Eungard et al. |
| 2008/0245086 | A1 | * | 10/2008 | Schenkel et al. ........ 62/228.1 |
| 2009/0095006 | A1 | * | 4/2009 | Smith et al. ........... 62/259.1 |
| 2009/0140097 | A1 | | 6/2009 | Collier et al. |
| 2009/0255204 | A1 | * | 10/2009 | Schwartau ............. 52/582.1 |
| 2010/0199596 | A1 | * | 8/2010 | Gosling et al. ......... 52/745.13 |
| 2010/0269427 | A1 | | 10/2010 | Digmann et al. |
| 2012/0018103 | A1 | | 1/2012 | Ashelin et al. |
| 2012/0233957 | A1 | * | 9/2012 | Walther ................. 52/707 |
| 2013/0255159 | A1 | | 10/2013 | Hoffmann |

FOREIGN PATENT DOCUMENTS

| | | |
|---|---|---|
| JP | 11-147558 A | 6/1999 |
| JP | 11-225815 A | 8/1999 |
| JP | 3882007 B2 | 2/2007 |
| JP | 4129545 B2 | 8/2008 |
| NL | 1005170 C2 | 8/1998 |

OTHER PUBLICATIONS

International Searching Authority, "The Written Opinion of the International Searching Authority," issued in connection with corresponding International Patent Application No. PCT/US2013/072842, mailed Oct. 9, 2014 (18 pages).

International Searching Authority, "The International Search Report," issued in connection with corresponding International Patent Application No. PCT/US2013/072842, mailed Oct. 9, 2014 (7 pages).

The International Bureau, "International Preliminary Report on Patentability," issued in connection with International Patent Application No. PCT/US2013/072842, mailed Jun. 25, 2015, 20 pages.

* cited by examiner

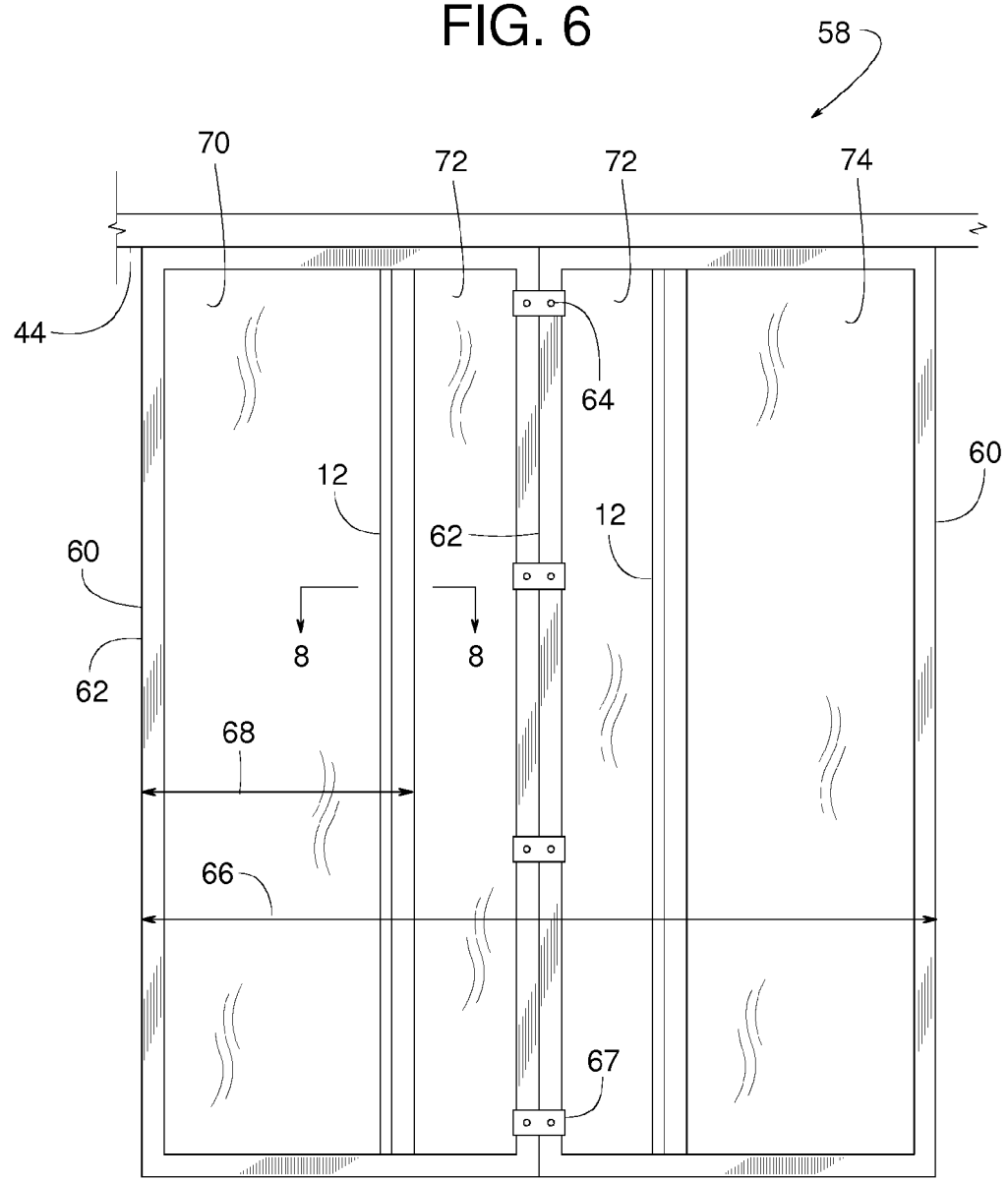

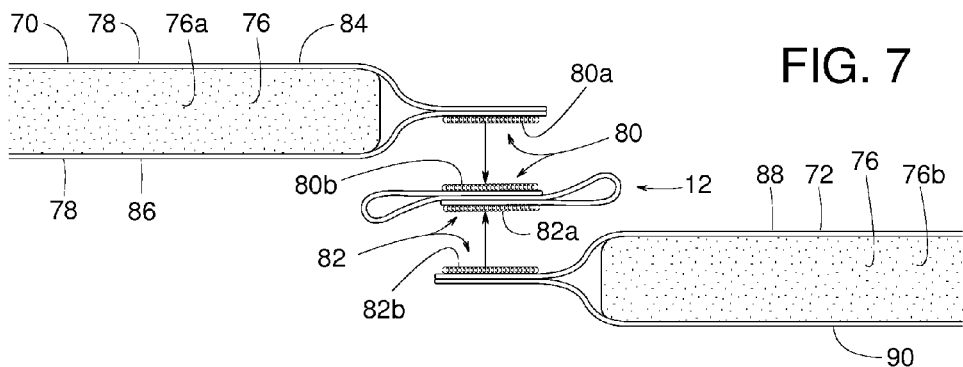
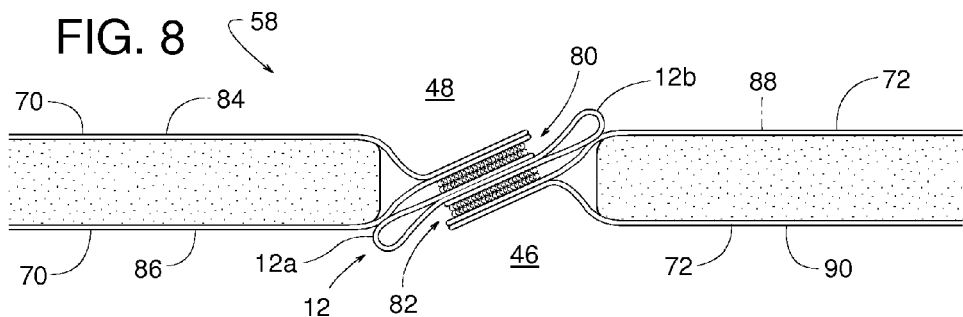
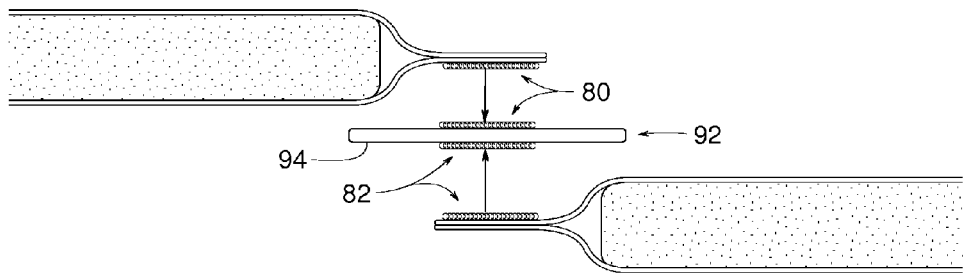
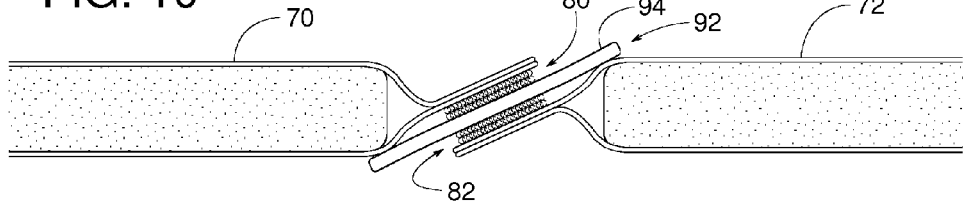

FROST INHIBITING JOINTS FOR INSULATED PANELS AND CURTAINS

FIELD OF THE DISCLOSURE

This patent generally pertains to insulated doors and curtains and, more specifically, to frost inhibiting joints for insulated panels and curtains.

BACKGROUND

Food manufacturers and distributors have a need to freeze food products quickly in order to maintain food product freshness and safety. Within a larger freezer room, a smaller area is cordoned off and is used as a blast freezer. The blast freezer performs this quick freeze using a high level of airflow at below freezing temperatures. In order to remove a stack of food products from the blast freezer and load the next stack quickly, a large sliding curtain wall or panel opens and closes by sliding on a track and trolley system. These sliding walls are insulated and can be up to 30 feet tall and 25 feet wide or larger.

BRIEF DESCRIPTION OF THE DRAWINGS

FIG. 6 is a back view of an example panel assembly constructed according to the teachings disclosed herein.

FIG. 7 is an exploded cross-sectional view of an example panel assembly constructed in accordance with FIGS. 6 and 8 and other teachings disclosed herein.

FIG. 8 is a cross-sectional view taken along line 8-8 of FIG. 6.

FIG. 9 is an exploded cross-sectional view of another example panel assembly constructed according to the teachings disclosed herein.

FIG. 10 is a cross-sectional view similar to FIG. 8 but showing the example panel assembly of FIG. 9.

DETAILED DESCRIPTION

FIGS. 1-10 show various example panel assemblies that can be used to provide a blast freezer within a larger freezer room. However, the panel assemblies may be used in other applications as well. The panel assemblies comprise at least first and second panels that, in some examples, are joined along their vertical edges to make one wider assembled panel. To reduce (e.g., prevent) frost from developing along the joint, various example seal members seal the joint. In some examples, two or more of the wider assembled panels are arranged to provide or create a blast freezer.

Figure 1:
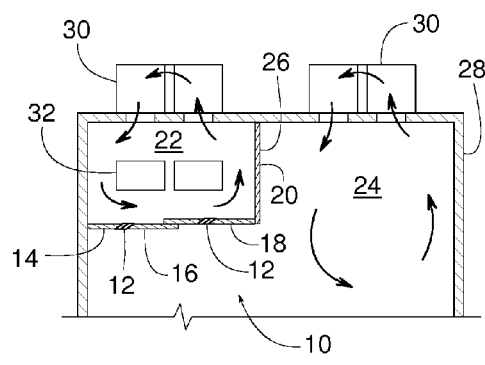
FIG. 1 is a schematic top view of an example panel assembly constructed according to the teachings disclosed herein.

FIG. 1, for instance, shows an example panel assembly 10 comprising a seal member 12 joining a first panel 14 to a second panel 16. Similar panel structures 18 and 20 are assembled to separate a first chilled area 22 from a second chilled area 24, thereby providing or creating a blast freezer 26 within a freezer room 28. For example, the first chilled area 22 may have an area (e.g., a square footage area) that is less than an area of the second chilled area 24. Air conditioning system 30 (one or more air conditioners) cools areas 22 and 24 to temperatures below freezing.

To rapidly freeze product 32 within blast freezer 26 in preparation for transferring product 32 to the freezer room's chilled area 24, air conditioning system 30 cools the blast freezer's chilled area 22 to a first freezing temperature (e.g., −45 degrees Celsius) that is significantly lower than a second freezing temperature (e.g., −20 degrees Celsius) of the main freezer room's chilled area 24. To further expedite freezing, in some examples, air conditioning system 30 provides greater air circulation in the blast freezer's chilled area 22 than in the freezer room's chilled area 24. In other words, the average air velocity in area 22 is greater than the average air velocity in area 24.

Figure 2:
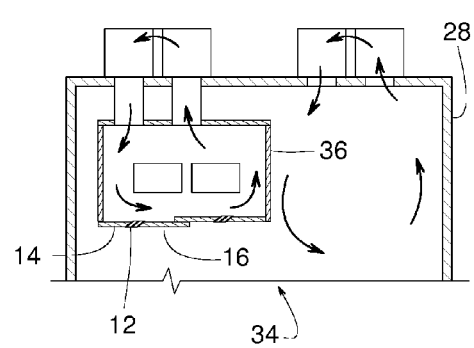
FIG. 2 is a schematic top view of another example panel assembly constructed according to the teachings disclosed herein.

FIG. 2 shows another example panel assembly 34 comprising seal member 12 joining panels 14 and 16. In this example, the panels 14 and 16 are arranged to provide a blast freezer 36 at alternate location within freezer room 28.

Figure 3:
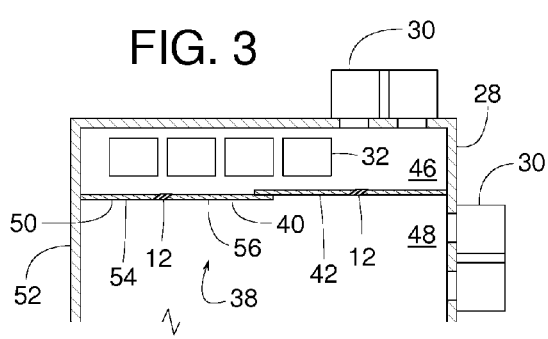
FIG. 3 is a schematic top view of yet another example panel assembly constructed according to the teachings disclosed herein.
Figure 4:
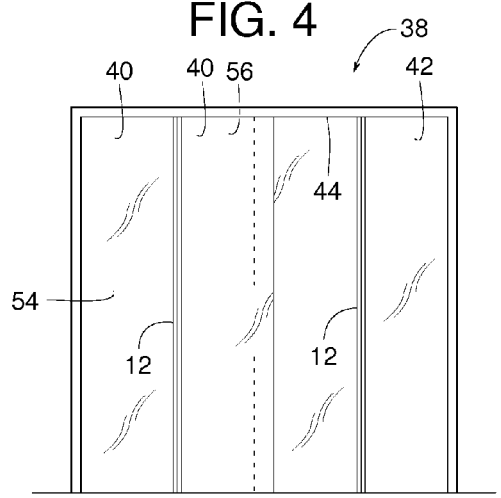
FIG. 4 is a front view of FIG. 3.
Figure 5:
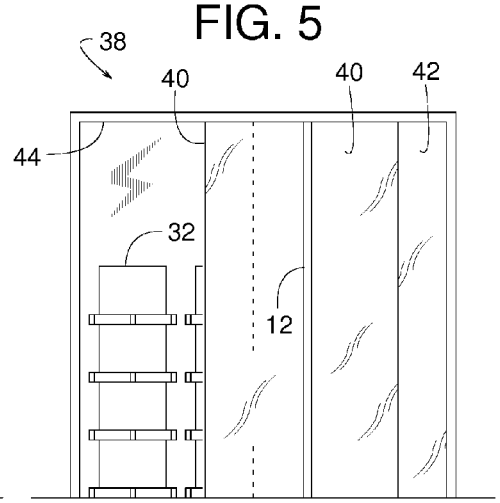
FIG. 5 is a front view similar to FIG. 4 but showing the example panel assembly of FIG. 4 moved to an open position.

FIGS. 3, 4 and 5 show an example panel assembly 38 having two assembled panels 40 and 42 that are suspended from a track structure 44 and arranged to separate a first chilled area 46 from a second chilled area 48, thereby providing or creating a blast freezer 50 within a freezer room 52. Each of the assembled panels 40 and 42 includes a seal member 12 joining, coupling and/or attaching a first panel 54 to a second panel 56. To provide access to products 32 within blast freezer 50, at least one assembled panel 40 can travel along track structure 44. FIG. 4, for example, shows blast freezer 50 closed with panel 40 at a first travel position, and FIG. 5 shows blast freezer 50 in at least a partially open position with panel 40 at a second travel position.

Although the structural details of the panel assemblies disclosed herein may vary, an example construction is illustrated in FIGS. 6, 7 and 8. In this example, a panel assembly 58 includes a tubular metal frame 60 having two subframes 62 that are joined by some suitable means, e.g., via a fastener, welding, screws 64, clips 67, etc. In examples where frame 60 has a frame width 66 that is at least fifty percent greater than a single panel width 68, at least a first panel 70 and a second panel 72 are mounted to frame 60 by some suitable means, e.g., via mechanical and/or chemical fasteners such as, for example, screws, snaps, clips, adhesive, clamps, etc. In some examples, a third panel 74 is also attached to frame 60, as shown in FIG. 6. As viewed in FIG. 6, upper, lower and left peripheral edges of first panel 70 are fastened to frame 60 by way of screws and/or some other suitable means. Upper and lower peripheral edges of second panel 72 are fastened to frame 60. Further, upper, lower and right peripheral edges of third panel 74 are fastened to frame 60. Seal 12 joins, couples and/or seals the right edge of first panel 70 to the left edge of second panel 72. Similarly, another seal 12 joins couples and/or seals the right edge of second panel 72 to the left edge of third panel 74.

In some examples, panel assembly 58 is lightweight so that panel assembly 58, when used for access to blast freezer 50, can be opened and closed rapidly. In some examples, panel assembly 58 has high thermal resistance to reduce (e.g., minimize) the load on air conditioning system 30. To achieve such benefits, in some examples, frame 60 is made of steel for rigidity but is hollow to reduce (e.g., minimize) weight. To further reduce (e.g., minimize) weight while providing sufficient thermal insulation, in some examples, each panel 70 and 72 includes a lightweight core of insulation 76 (e.g., polyester batting, polyurethane foam, etc.) sandwiched between two outer sheets 78 made of a pliable material (e.g., vinyl sheeting, vinyl fabric, coated nylon fabric, cloth fabric with vinyl coating, cloth fabric with other coating, neoprene sheeting, coated polyester fabric, etc.). The term, "pliable" as used in this patent to describe a sheet of material means the sheet is sufficiently flexible to be folded over onto itself and subsequently unfolded without appreciable permanent damage. In some examples, for each individual panel 70 and 72, insulation 76 is contained within the panel 70 and 72 by having the panel's outer sheets 78 joined along their perimeters by some suitable means. Examples of such means include, but are not limited to, sewing, thermal bonding, gluing, chemical adhering, etc.

To provide a sealed joint (e.g., a vertical or lateral joint) between adjacent panels 70 and 72, in some examples, seal member 12 has a sheet of material that includes a first loop 12a sealingly touching or engaging first panel 70 and a second loop 12b sealingly touching or engaging second panel 72. In some examples, loops 12a and 12b are formed by folding a single sheet material of seal member 12 back over onto itself from either direction and sewing the resulting two loops in place. Examples materials of seal member 12 include, but are not limited to, chlorosulfonated polyethylene synthetic rubber or CSM or CSPE (also known as HYPALON, which is a registered trademark of DuPont of Wilmington, Del.); canvas duck; rubber-impregnated fabric; coated or uncoated nylon, polyester or vinyl fabric; other fabric materials, neoprene sheeting, vinyl sheeting, other flexible polymeric sheeting, etc.

In the illustrated example, a first touch-and-hold fastener 80 and a second touch-and-hold fastener 82 connect seal member 12 to first panel 70 and second panel 72, respectively. The term, "touch-and-hold" fastener refers to means for connecting two parts together, wherein the two parts become connected upon simply forcing one part up against the other. A VELCRO hook-and-loop fastener is one example of a touch-and-hold fastener, (VELCRO is a registered trademark of Velcro USA Inc. of Manchester, N.H.). While air can pass through an unsealed VELCRO connection, loops 12a and 12b sealingly engaging panels 70 and 72 inhibit air from bypassing or flowing through seal member 12. Restricting (e.g., preventing) the colder air from the first chilled area 46 of blast freezer 50 from flowing through seal member 12 to the second chilled area 48 of the less cold freezer room 52 reduces (e.g., minimizes) heat loss and helps reduce (e.g., prevent) frost from developing on the freezer room 52 side of seal member 12.

In some examples, panel assembly 58 includes first panel 70 having a first core of insulation 76a sandwiched or otherwise positioned between a first warmer sheet 84 and a first cooler sheet 86. The terms, "warmer sheet" and "cooler sheet" do not necessarily pertain to temperature but are used merely for distinguishing one sheet from the other based solely on the orientation or the direction the sheets face. For example, a warmer sheet and a cooler sheet face in opposite directions. In some examples, panel assembly 58 also includes second panel 72 having a second core of insulation 76b sandwiched or otherwise positioned between a second warmer sheet 88 and a second cooler sheet 90. Warmer sheets 84 and 88 face in one direction (e.g., away blast freezer 50), and cooler sheets 86 and 90 face in the opposite direction (e.g., toward blast freezer 50). In other words, warmer sheets 84, 88 are positioned in fluid communication with the freezer room 52 and cooler sheets 86 and 90 are positioned in fluid communication with the blast freezer 50. Seal member 12, as shown in FIG. 8, sealing touches or engages first cooler sheet 86 and second warmer sheet 88.

First touch-and-hold fastener 80 has a first engaging piece 80a and a first mating piece 80b. The first engaging piece 80a is attached and/or (directly or indirectly) coupled to first cooler sheet 86, and the first mating piece 80b is attached and/or (directly or indirectly) coupled to seal member 12. The terms, "engaging" and "mating" refer to the two connecting pieces of a touch-and-hold fastener. In the example of a VELCRO hook-and-loop fastener, the engaging piece can refer to the hook piece or the loop piece. In examples where the engaging piece refers to the hook piece, the mating piece refers to the loop piece. In examples where the engaging piece refers to the loop piece, the mating piece refers to the hook piece.

Second touch-and-hold fastener 82 has a second engaging piece 82a and a second mating piece 82b. The second mating piece 82b is attached and/or (directly or indirectly) coupled to the second warmer sheet 88, the second engaging piece 82a is attached and/or (directly or indirectly) coupled to seal member 12. With such an arrangement of engaging and mating pieces, pieces 80a and 80b mate to fasten seal member 12 to first panel 70, and pieces 82a and 82b mate to fasten seal member 12 to second panel 72, as shown in FIG. 8. Alternatively, in some examples, first engaging piece 80a mates with second mating piece 82b to fasten first panel 70 directly to second panel 72 without the intervening seal member 12. In some examples, existing blast freezer installations originally assembled without seal members 12 can later be retrofit by adding seal members 12.

In the example shown in FIGS. 9 and 10, a seal member 92 is made of a material different than a sheet of material folded to provide two sealing loops. Seal member 92 is illustrated to represent any sealing structure 94 that in combination with first and second touch-and-hold fasteners 80 and 82 can join, attach, couple and/or seal panels 70 and 72. Examples of sealing structure 94 include, but are not limited to, a vertically elongate foam pad or strip, a vertically elongate flexible strip of material (e.g., rubber, polyurethane, HYPALON, flexible PVC) and a vertically elongate rigid strip of material (e.g., rigid PVC, aluminum). In some examples, sealing contact between sealing structure 94 and panels 70 and 72 is provided in various ways, examples of which include, but are not limited to, the sealing structure's compliance to panels 70 and 72, the panels' compliance to sealing structure 94, and/or a sealingly contoured shape of sealing structure 94.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:
1. A panel assembly comprising:
a first panel defining a first vertical edge;
a second panel defining a second vertical edge, the first panel positionable adjacent the second panel such that the first vertical edge is adjacent the second vertical edge;
a seal having a first loop directly touching an outer surface of the first panel and a second loop directly touching an outer surface of the second panel to restrict airflow between the first and second vertical edges of the respective first and second panels;
a first touch-and-hold fastener to attach the seal to the first panel; and
a second touch-and-hold fastener to attach the seal to the second panel.

2. The panel assembly of claim 1, wherein the first touch-and-hold fastener is positioned between the first panel and the seal, the second touch-and-hold fastener is positioned between the second panel and the seal, and the seal is positioned between the first touch-and-hold fastener and the second touch-and-hold fastener.

3. The panel assembly of claim 1, wherein the first touch-and-hold fastener comprises a first engaging piece and a first mating piece, the second touch-and-hold fastener comprises a second engaging piece and a second mating piece, the first engaging piece is attached to the first panel, the first mating piece is attached to a first side of the seal, the second engaging piece is attached to a second side of the seal, and the second mating piece is attached to the second panel.

4. The panel assembly of claim 3, wherein the first panel comprises a first core of insulation positioned between a first warmer sheet and a first cooler sheet, the second panel comprises a second core of insulation positioned between a second warmer sheet and a second cooler sheet, the first engaging piece is coupled to the first cooler sheet, and the second mating piece is coupled to the second warmer sheet, wherein each of the first cooler sheet, the second cooler sheet, the first warmer sheet, and the second warmer sheet is flexible.

5. The panel assembly of claim 1, wherein the first panel comprises a first core of insulation positioned between first warmer sheet and a first cooler sheet, the second panel comprises a second core of insulation positioned between second warmer sheet and second cooler sheet, and the seal engages the first cooler sheet and the second warmer sheet.

6. The panel assembly of claim 1, wherein the seal is comprised of foam.

7. The panel assembly of claim 1, further comprising a metal frame to which the first panel and the second panel are attached, the metal frame having a frame width, the first panel having a first panel width, the second panel having a second panel width, the frame width being at least fifty percent greater than the first panel width, and the frame width being at least fifty percent greater than the second panel width.

8. The panel assembly of claim 7, further comprising a track structure suspending the metal frame, the metal frame having selectively a first travel position and a second travel position along the track structure.

9. The panel assembly of claim 1, wherein the first panel and the second panel are positioned between a first chilled area and a second chilled area, the first chilled area being at a first freezing temperature, the second chilled area being at a second freezing temperature, the first chilled area being warmer than the second chilled area.

10. A panel assembly comprising:
a first panel having a first flexible lip adjacent a first edge of the first panel;
a second panel adjacent the first panel, the second panel having a second flexible lip adjacent a second edge of the second panel;
a seal coupled to the first and second panels via the first and second lips and having a portion directly touching the first panel and the second panel to restrict airflow between the first and second panels, the seal extending along a length substantially similar to lengths of the respective first and second panels;
a first touch-and-hold fastener comprising a first engaging piece and a first mating piece, the first engaging piece attached to the first panel, the first mating piece attached to the seal, the first mating piece attached to the first engaging piece; and
a second touch-and-hold fastener comprising a second engaging piece and a second mating piece, the second engaging piece attached to the seal, and the second mating piece attached to the second panel, the second mating piece attached to the second engaging piece, the first touch-and-hold fastener sandwiched between the first panel and the seal, the second touch-and-hold fastener sandwiched between the second panel and the seal, and the seal sandwiched between the first touch-and-hold fastener and the second touch-and-hold fastener.

11. The panel assembly of claim 10, wherein the first panel comprises a first core of insulation sandwiched between a first warmer sheet and a first cooler sheet, the second panel comprises a second core of insulation sandwiched between a second warmer sheet and a second cooler sheet, the first engaging piece is attached to the first cooler sheet, and the second mating piece is attached to the second warmer sheet.

12. The panel assembly of claim 10, wherein the first panel comprises a first core of insulation sandwiched between a first warmer sheet and a first cooler sheet, the second panel comprises a second core of insulation sandwiched between a second warmer sheet and a second cooler sheet, and the seal engages the first cooler sheet and the second warmer sheet.

13. The panel assembly of claim 10, wherein the seal comprises a sheet of material that includes a first loop touching the first panel and a second loop touching the second panel.

14. The panel assembly of claim 10, wherein the seal is comprised of foam.

15. The panel assembly of claim 10, further comprising a metal frame to which the first panel and the second panel are attached, the metal frame having a frame width, the first panel having a first panel width, the second panel having a second panel width, the frame width being at least fifty percent greater than the first panel width, and the frame width being at least fifty percent greater than the second panel width.

16. The panel assembly of claim 15, further comprising a track structure suspending the metal frame, the metal frame having selectively a first travel position and a second travel position along the track structure.

17. The panel assembly of claim 10, wherein the first panel and the second panel are positioned between a first chilled area and a second chilled area, the first chilled area being at a first freezing temperature, the second chilled area being at a second freezing temperature, the first freezing temperature being colder than the second freezing temperature.

18. A panel assembly comprising:
a first panel comprising a first core of insulation positioned between a first pliable warmer sheet and a first pliable cooler sheet, wherein respective ends of the first pliable warmer sheet and the first pliable cooler sheet overlap at least a portion of a first edge of the first core such that the first pliable warmer sheet and the first pliable cooler sheet engage to define a first lip adjacent a first vertical edge of the first panel;
a second panel comprising a second core of insulation positioned between a second pliable warmer sheet and a second pliable cooler sheet, wherein respective ends of the second pliable warmer sheet and the second pliable cooler sheet overlap at least a portion of a second edge of the second core such that the second pliable warmer sheet and the second pliable cooler sheet engage to define a second lip adjacent a second vertical edge of the second panel;
a seal positioned adjacent the first and second vertical edges of the respective first and second panels, the seal directly touching at least one of the first pliable cooler sheet or the first pliable warmer sheet of the first panel and at least one of the second pliable cooler sheet or the second pliable warmer sheet of the second panel;

a first hook-and-loop fastener positioned between the first panel and the seal, the first hook-and-loop fastener having a first engaging piece and a first mating piece, the first engaging piece attached to the first lip of the first panel, the first mating piece attached to the seal, and the first mating piece attached to the first engaging piece; and a second hook-and-loop fastener positioned between the second panel and the seal, the second hook-and-loop fastener having a second engaging piece and a second mating piece, the second mating piece attached to the second lip of the second panel, the second engaging piece attached to the seal, the second mating piece attached to the second engaging piece, and the seal positioned between the first hook-and-loop fastener and the second hook-and-loop fastener.

19. The panel assembly of claim 18, wherein the seal comprises a sheet of material that includes a first loop directly touching the first panel and a second loop directly touching the second panel.

20. The panel assembly of claim 18, wherein the seal is comprised of foam.

21. The panel assembly of claim 18, further comprising a metal frame to which the first panel and the second panel are attached, the metal frame having a frame width, the first panel having a first panel width, the second panel having a second panel width, the frame width being at least fifty percent greater than the first panel width, and the frame width being at least fifty percent greater than the second panel width.

22. The panel assembly of claim 21, further comprising a track structure suspending the metal frame, the metal frame having selectively a first travel position and a second travel position along the track structure.

23. The panel assembly of claim 18, wherein the first panel and the second panel are positioned between a first chilled area and a second chilled area, the first chilled area being at a first freezing temperature, the second chilled area being at a second freezing temperature, the first chilled area being colder than the second chilled area.

24. The panel assembly of claim 1, wherein the seal comprises a vertical length substantially similar to vertical lengths of the respective first and second panels.

25. The panel assembly of claim 1, wherein the first touch-and-hold fastener is attached to the seal and the first vertical edge of the first panel, and the second touch-and-hold fastener is attached to the seal and the second vertical edge of the second panel.

26. The panel assembly of claim 18, wherein the seal restricts airflow through the first and second hook-and-loop fasteners between respective vertical edges of the first and second panels coupled to the seal.

* * * * *